United States Patent
Ramón Salguero et al.

(10) Patent No.: US 9,774,542 B2
(45) Date of Patent: Sep. 26, 2017

(54) COMPUTER-IMPLEMENTED METHOD AND A SYSTEM FOR PROVIDING A NETWORKING SERVICE, AND A COMPUTER PROGRAM PRODUCT ADAPTED TO PERFORM THE METHOD

(71) Applicant: Telefonica, S.A., Madrid (ES)

(72) Inventors: Francisco Javier Ramón Salguero, Madrid (ES); Pedro Andrés Aranda Gutiérrez, Madrid (ES); Alfonso Tierno Sepúlveda, Madrid (ES); Rafael Alejandro Lopez Da Silva, Madrid (ES)

(73) Assignee: Telefonica, S.A., Madrid (ES)

( * ) Notice: Subject to any disclaimer, the term of this patent is extended or adjusted under 35 U.S.C. 154(b) by 279 days.

(21) Appl. No.: 14/652,206

(22) PCT Filed: Dec. 19, 2013

(86) PCT No.: PCT/EP2013/077365
§ 371 (c)(1),
(2) Date: Jun. 15, 2015

(87) PCT Pub. No.: WO2014/102134
PCT Pub. Date: Jul. 3, 2014

(65) Prior Publication Data
US 2015/0326496 A1     Nov. 12, 2015

(30) Foreign Application Priority Data

Dec. 27, 2012 (EP) .................................... 12382539

(51) Int. Cl.
*H04L 29/08* (2006.01)
*H04L 12/911* (2013.01)
(Continued)

(52) U.S. Cl.
CPC .............. *H04L 47/783* (2013.01); *G06F 8/61* (2013.01); *G06F 9/5044* (2013.01);
(Continued)

(58) Field of Classification Search
CPC ... H04L 47/783; H04L 67/16; H04L 41/5096; H04L 41/145; H04L 41/5041; G06F 9/5044; G06F 9/5066; G06F 8/61
See application file for complete search history.

(56) References Cited

U.S. PATENT DOCUMENTS

| | | | |
|---|---|---|---|
| 2005/0021831 A1 | 1/2005 | Andrzejak et al. | |
| 2007/0220586 A1* | 9/2007 | Salazar .................. | G06N 3/126 726/1 |

(Continued)

FOREIGN PATENT DOCUMENTS

EP     1 372 073 A2     12/2003

OTHER PUBLICATIONS

Diego Lopez et al., "Network Functions Virtualisation", SDN and Openflow World Congress, Oct. 22-24, 2012, Issue 1, pp. 1-16, Darmstadt, Germany.

(Continued)

*Primary Examiner* — Philip Chea
*Assistant Examiner* — Wuji Chen
(74) *Attorney, Agent, or Firm* — Sughrue Mion, PLLC

(57) ABSTRACT

The method comprises mapping software-based network functions to hardware resources included in a hardware resource pool, wherein the mapping is performed dynamically on unallocated resources of the hardware resource pool and based on at least the next information:
  specific hardware constraints for the supporting of each of said software-based network functions;
  network requirements of at least one defined networking service design for a service making use of said hard-
(Continued)

ware resource pool and of at least part of said software-based network functions; and a hardware description of the hardware resources included in the hardware resource pool.

The system is configured for implementing the method of the invention.

The computer program product is adapted to perform the method of the invention.

12 Claims, 7 Drawing Sheets

(51) Int. Cl.
*H04L 12/24* (2006.01)
*G06F 9/445* (2006.01)
*G06F 9/50* (2006.01)

(52) U.S. Cl.
CPC .......... *G06F 9/5066* (2013.01); *H04L 41/145* (2013.01); *H04L 41/5041* (2013.01); *H04L 41/5096* (2013.01); *H04L 67/16* (2013.01)

(56) References Cited

U.S. PATENT DOCUMENTS

| | | | |
|---|---|---|---|
| 2011/0296370 A1* | 12/2011 | Ferris | G06F 9/44536 717/100 |
| 2014/0201374 A1* | 7/2014 | Ashwood-Smith | H04L 49/70 709/226 |
| 2014/0317261 A1* | 10/2014 | Shatzkamer | G06F 9/455 709/223 |
| 2017/0063714 A1* | 3/2017 | Xiang | H04L 47/762 |

OTHER PUBLICATIONS

International Search Report of PCT/EP2013/077365 dated Feb. 27, 2014.

Written Opinion of the International Searching Authority of PCT/EP2013/077365 dated Feb. 27, 2014. [PCT/ISA/237].

* cited by examiner

COMPUTER-IMPLEMENTED METHOD AND A SYSTEM FOR PROVIDING A NETWORKING SERVICE, AND A COMPUTER PROGRAM PRODUCT ADAPTED TO PERFORM THE METHOD

CROSS REFERENCE TO RELATED APPLICATIONS

This application is a National Stage of International Application No. PCT/EP2013/077365 filed Dec. 19, 2013, claiming priority based on European Patent Application No. 12382539.0, filed Dec. 27, 2012, the contents of all of which are incorporated herein by reference in their entirety.

FIELD OF THE ART

This invention generally relates, in first aspect, to a computer-implemented method for providing a networking service, comprising mapping software-based network functions to hardware resources, and more particularly to a method where said mapping is performed dynamically based on several sources of information regarding the software-based network functions, the hardware resource pool and some network requirements.

A second aspect of the invention concerns to a system configured for implementing the method of the first aspect.

A third aspect of the invention relates to a computer program product adapted to perform the method of the first aspect.

PRIOR STATE OF THE ART

Current state-of-the-art processors have enough processing power to run software-based network functionalities with high throughput demands. In order to meet these throughput demands, software (SW) implementations of network functionalities must make an intensive use of the processing units (cores) in the processor, which requires distributing the processing among a number of threads. As a consequence, these threads need to interchange huge amounts of data between them and these internal communications often may become the actual bottleneck of the application. In order to make these internal communications as efficient as possible, such SW applications require the code to be mapped in an optimal way to the processing units of the underlying hardware to maximise the number of cache hits in inter-core communications, which may speed up significantly the communication between those cores handling the biggest amounts of data. Current techniques of grid computing and virtualization ([1] [2] [3]) do not take into account these specific requirements of mapping for network software and, hence, yield inadequate performance.

This mapping of network software to hardware (HW) at the "microscopic" level should be integrated in an overall network design approach that, additionally, took into account design criteria at the "macroscopic" level (topological and geographic network restrictions) as well as the difference in requirements at the micro level that some network control functionalities may have as opposed to those required by data plane and other very demanding and critical network control functionalities.

Next, the mapping solutions offered by the most relevant technical background/existing technology, are cited and described.

Memory and I/O Access in Multi-Core and Multi-Socket Systems:

In state-of-the-art computing systems [4], bandwidth (BW) to access memory deployed on the mainboard is much lower than the internal processor BW and memory accesses may slow down overall performance significantly in memory-intensive (or I/O-intensive) jobs. Therefore, processor vendors include one or more layers of high BW memory between the processor and the main memory, known as cache memory, which speeds up processing significantly. There are normally two levels of cache memory, one included typically in the system board and one in the processor chip. The amount of cache memory deployed in the system board is in the order of magnitude of megabytes compared to gigabytes of system memory. Likewise, the amount of memory on chip is significantly smaller than the amount of on-board memory. However, cache memory in state-of-the-art processors is much faster than on-board cache memory.

Regarding code execution, state-of-the-art processors include a subsystem that takes into account the effect of memory accesses and try to reorder the code in execution in such a way that cache memory hits are maximised. Execution speed, and thereby system throughput, can be very adversely impacted by the placement of individual instructions in the code program that cannot be handled by this subsystem. Therefore, state-of-the-art compilers incorporate all this knowledge and produce a code that ensures minimal processing throughput reduction due to memory accesses.

Processors access memory to fetch code and data. Access to data needs also to be optimised in order to make the best use of the caching mechanisms. Fetching data which is not in the cache memory has a significant impact on system performance (this situation is called cache miss).

In multi-core systems, the processing functionality is spread among different cores. Each core executes a specific portion of the code in an independent fashion. Communication between processes is implemented by means of message passing mechanisms—e.g. queues—using shared memory zones which require continuous accesses.

The situation is worsened in multi-socket systems, where several multi-core processors are interconnected. In such systems, all processor cores in all processor sockets in the board have access to all the memory in the system. However, all cores on a socket have only a direct connection to a specific on-board memory area, known as memory bank. When a core needs to access data located on a memory bank connected to a different socket, this access uses an inter-processor connection bus with limited bandwidth. Such accesses are slower and have an extreme impact on system throughput when huge amounts of data need to be handled. This also applies to access to I/O cards, such as network interfaces.

Virtualisation Tools:

Virtualisation is a term used to refer to the techniques by which a physical machine is made to appear as different virtual machines to different users, so that effective sharing of hardware resources can be achieved in a transparent fashion for the users.

Vendors offering virtualisation-capable processors provide hardware (HW) acceleration features that help state-of-the-art virtualisation environments to minimise their impact on system throughput. For example, Intel offers VT-x, VT-d and other virtualisation extensions:

VT-x provides virtualisation support for memory access. It provides a fast access to memory management registers inside the CPU.

VT-d provides virtualisation support specific to accessing I/O devices. It allows using peripheral devices directly, by remapping direct memory access (DMA) and interrupts.

The above mentioned existing solutions have the next problems:

Adaptation of code to motherboard architecture:

As discussed previously, memory and I/O access are key factors to achieve the levels of throughput needed for carrier-class network functionality applications like routing, switching, NAT, etc. where real-time processing of considerable amounts of packets arriving at I/O interfaces is required. This implies that packets arriving at I/O interfaces have to be transferred to internal memory to be processed and then sent back to I/O interfaces again. These carrier-class network applications differ from regular applications in their need to move internally huge amounts of data at maximum speed, even though the processing to be applied to this data might be swallow.

With the evolution of processor architectures, processors are able to execute an increasing number of threads in parallel. Additionally, features have been added to the processors that help optimising access to memory or I/O. These characteristics of the system at the microscopic level are especially important for high throughput applications that interchange many data between their processes/threads, as is the case of network functionality applications in general and, particularly, for data-plane switching functions. The right distribution of the software threads/processes among the physical cores in a processor and between processors in a multi-socket system are a must in order to minimize the amount of data interchanged in the socket interconnection and I/O buses. With a sub-optimal distribution of the processes, the throughput that this software can manage will be considerably lower due to unnecessary saturation of internal buses. Hence, guidelines to adapt the code to the motherboard architecture, describing how to distribute the functional blocks and how to connect I/O interface cards in a multi-core environment, are mandatory. These guidelines are currently derived from ad-hoc performance tests that are executed during the software production phase. In most cases, this correct placement is the result of a trial-and-error process often performed by the own network application producer.

Loss of detailed HW view introduced by Virtualisation layers:

Even though, as explained previously, there exist tools for virtualisation environments to take advantage of processor hardware acceleration features, the virtualisation layer hides details such as the specific physical core(s) where an application is running or, even, if they belong to the same or different processors. As already explained above, network functionality SW designed for multi-core environments needs to be allocated in HW resources with precision in order to optimise the access to shared memory areas and minimise cache misses and buses utilisation. Therefore, optimisations defined during the SW production phase, especially all process distribution strategies, may be invalidated when a virtualisation layer is introduced.

To sum up, none of the existing solutions provides a mapping for network software to hardware which covers the above indicated requirements regarding the "microscopic" and "macroscopic" levels (these terms are duly described below in the sense they have to be understood according to the present invention).

REFERENCES

[1] Ian Foster. Jul. 20, 2002. What is the Grid? A Three Point Checklist.

[2] Sotomayor, B., Keahey, K., Foster, I.: Overhead matters: A model for virtual resource management. In: VTDC 2006: Proceedings of the 2nd International Workshop on Virtualization Technology in Distributed Computing, Washington, D.C., USA, p. 5. IEEE Computer Society, Los Alamitos (2006).

[3] Zhiming Shen, Sethuraman Subbiah, Xiaohui Gu, and John Wilkes. 2011. CloudScale: elastic resource scaling for multi-tenant cloud systems. In Proceedings of the 2nd ACM Symposium on Cloud Computing (SOCC '11). ACM, New York, N.Y., USA.

[4] George Jones: Motherboards & Core-Logic Chipsets: The Deep Stuff, Oct. 22, 2004.

[5] http://www.tid.es/es/Documents/NFV_White_PaperV2.pdf. Network Functions Virtualisation White Paper.

[6] Marc Grimme, Mark Hlawatschek, and Thomas Merz of ATIX, Munich, Germany. Data sharing with a GFS storage cluster. July 2006.

[7] Guilherme Piegas Koslovski, Pascale Vicat-Blanc Primet1 and Andrea Schwertner Charao. 2008. VXDL: Virtual Resources and Interconnection Networks Description Language.

[8] Chien, A., Casanova, H., Kee, Y.s., Huang, R.: The Virtual Grid Description Language: vgDL. Technical Report TR0.95, VGrADS Project (2004).

[9] Ham, J. J. van der (2010 Apr. 23). A semantic model for complex computer networks—the network description language. Universiteit van Amsterdam (164 pag.). Prom./coprom.: prof.dr. P. M. A. Sloot & prof.dr.ir. C. T. A. M. de Laat.

DESCRIPTION OF THE INVENTION

It is necessary to offer an alternative to the state of the art which covers the gaps found therein, particularly related to the lack of proposals which really offer a good solution for the above described mapping.

To that end, the present invention concerns, in a first aspect, to a computer-implemented method for providing a networking service, comprising mapping software-based network functions (understood as functionalities, implemented in software, that a network operator has to deploy to provide networking services to its customers) to hardware resources, wherein said hardware resources are included in a hardware resource pool, said pool referring to a collection of hardware nodes where different network functions are to be deployed.

Examples of software-based network functions are functions relating to: BRAS (Broadband Remote Access Server), CGNAT (Carrier Grade Network Address Translation), DHCP (Dynamic Host Configuration Protocol), etc.

Contrary to known proposals, in a characteristic manner, in the method of the first aspect said mapping is performed dynamically on unallocated resources of said hardware resource pool and based on at least the next information:
- specific hardware constraints for the supporting of each of said software-based network functions;
- network requirements of at least one defined networking service design for a service making use of said hardware resource pool and of at least part of said software-based network functions; and
- a hardware description of the hardware resources included in the hardware resource pool.

Preferably, said specific hardware constraints information is provided without taking into account information about said hardware resource pool and said hardware description information is provided without taking into account information about said software-based network functions.

Said software-based network functions are implemented, according to an embodiment, by software appliances, each implementing at least one software-based network function, and said specific hardware constraints information is provided by means of software appliance declarations including information regarding the network function or functions implemented and at least one specific hardware configuration recommended for the implementation thereof, where said software appliance declarations are generally provided by software appliance vendors.

In an embodiment of the method of the first aspect of the invention, said hardware constraints refer at least to hardware requirements and to the expected performance for at least said specific hardware configuration to support each software-based network function of each software appliance.

Examples of information included in said hardware requirements are given in a posterior section.

Said expected performance relates, according to an embodiment, to at least one of maximum amount of users supported, maximum number of devices supported, maximum number of service points served and maximum throughput supported.

Regarding said network requirements, they relate, according to an embodiment, to at least software-based network functions to be deployed in Points of Presence and an amount of clients which need to be served, and are provided, generally, by a Network Operator.

Preferably, said network requirements are provided without taking into account information about hardware elements deployed in a given Point of Presence.

According to an embodiment, the network requirements are provided by means of a networking service design definition with topological requirements (e.g. BRAS deployed at location x, each CGNAT node serving n BRAS nodes, etc.), throughput requirements for each software-based network function (e.g. router switching at least y Gbps) and connectivity requirements between said software-based network functions (e.g. upstream link for BRAS with 10 Gbps bandwidth).

Said networking service design definition includes, for different embodiments, information relating at least one of:
  average traffic characterization of the service points;
  networking service data chain, detailing of the software-based network functions that must be applied to the data traffic ingressing the network from the service points in the upstream direction;
  networking service control chains, each detailing a set of software-based network functions that interchange control traffic required for a specific particular purpose of the networking service;
  network function areas definition, where each network function area is a per-network function collection of locations of the hardware resource pool; and
  a set of preconditions on the hardware resource pool regarding software-based network functions placement.

As for said hardware resource pool is concerned, it comprises, for a preferred embodiment:
  a plurality of computational nodes deployed across several physical locations, where each location is specified by the components of its computational node at an computer architecture or microscopic level or view, and
  a layout by which these computational nodes are interconnected among them both inside the location and/or to other locations with corresponding connections, at a network or macroscopic level or view.

For an embodiment, said hardware description provides information regarding the locations of the hardware resource pool, providing both the macroscopic and the microscopic view of each location, including at least one of location name, location classes, data plane connection available at the location, number of service points commissioned physically to the data plane connection of the location, number of hand-off points commissioned physically to the data plane connection of the location, list of connection interfaces that connect the location to the rest of the hardware resource pool and list of computational nodes at the location.

Examples of information included in said list of computational nodes are given in a posterior section.

According to a preferred embodiment, said computational nodes are computing servers (or any other kind of computer device), and at least part of said connections are WAN (Wide Area Network) connections.

For said or another embodiment, at least part of said connections are connections regarding other kind of access networks, wired or wireless.

In the above paragraphs and in the rest of the present description and claims:
  The terms microscopic or micro are used to refer to the computer architecture level. Therefore what is meant by microscopic view of a location is the detailed description of the servers deployed at that location at the computer architecture level, including processors, sockets, memory banks, etc. for each of the servers at the location; and
  The terms macroscopic and macro are used to refer to the network level. Therefore what is meant by macroscopic view of the hardware pool is the description of the interconnection of the servers of the hardware resource pool at the network level making use of both WAN (and/or any other type of wired or wireless access network) and local connections.

The method of the first aspect of the invention comprises, for a preferred embodiment, deploying said networking service by at least constituting a network with the hardware resources to which the software-based network functions are mapped, and the interconnection thereof.

According to a further embodiment, the method of the first aspect of the invention comprises deploying said networking service by interconnecting said constituted network with at least one external network.

Said deployment is performed according to a deployment strategy generated by the method of the first aspect of the invention so that yields the above described appropriate mapping of the software-based network functions into a subset of unallocated resources of the hardware resource pool while meeting all the aforementioned restrictions.

A second aspect of the invention concerns to a system for providing a networking service, comprising a hardware resource pool and a computing device having access to said hardware resource pool and to software-based network functions, where said computing device implements a method for providing a networking service comprising mapping software-based network functions to hardware resources of said hardware resource pool.

In the system of the second aspect of the invention, in a characteristic manner, said computing device implements the method of the first aspect.

A third aspect of the invention concerns to a computer program product, comprising software code adapted to perform, when executed in a computer, the method of the first aspect of the invention.

The main advantages of the proposed method, system and computer program are found in their allowing of software-based network functions to be deployed in a more efficient way than with today's methods, because it automatically selects the optimal match for the underlying hardware. It allocates networks functions in an optimal way (from a network performance point of view), offers the advantages of virtualization in terms of secure sharing of hardware resources (avoiding overprovisioning) and, at the same time, it takes into account the microscopic view of requirements of the network functions. Additionally, it enables the automation of the deployment cycle, reducing the costs to operate the whole network.

BRIEF DESCRIPTION OF THE DRAWINGS

The previous and other advantages and features will be more fully understood from the following detailed description of embodiments, with reference to the attached drawings which must be considered in an illustrative and non-limiting manner, in which.

DETAILED DESCRIPTION OF SEVERAL EMBODIMENTS

Figure 1:
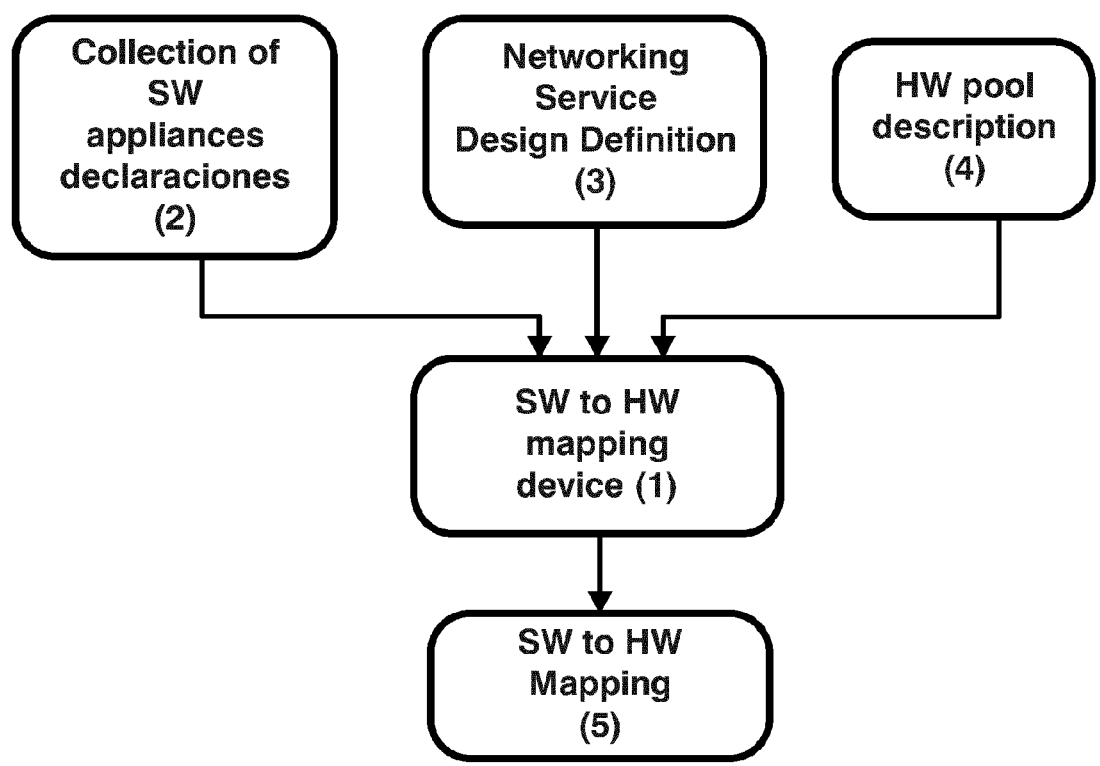
FIG. 1 is a block diagram which schematically illustrates the system of the second aspect of the invention, for an embodiment.

As shown in FIG. 1, the system of the second aspect of the invention comprises, for the illustrated embodiment, a computing device (1) in charge of the mapping of SW-based Network Functions, implemented by means of SW appliances, to specific HW resources of a HW pool, implementing the method of the first aspect of the invention.

The executive part of said mapping is represented in FIG. 1 by block (5), which is under the control of computing device (1).

The system uses three distinct inputs towards the computing device (1), to achieve the mapping of SW appliances to HW resources:
A collection of SW appliances declarations (2).
A Networking service Design Definition (3).
A HW pool description (4).

Each of these inputs can be provided to the SW-to-HW mapping device (1) by independent actors involved in the process:
The SW appliance declarations are provided by the SW appliance vendors, describing the amount of users, devices, throughput, etc. which can be supported in a specific HW configuration of the SW appliance implementing a Network Function. The SW appliance vendor ignores what will be the actual HW elements where the SW appliance will be deployed in the end.
The Networking service Design Definition is provided by the Network Operator, who defines their service as a set of requirements in terms of Network Functions to be deployed in their Points of Presence (PoPs) and an amount of clients (users, devices, etc.) which need to be served. The network operator may add additional restrictions for some of these network functions. For example, one such restriction could impose that a CDN capabilities are deployed as close as possible to the end-customers to be served. However, the details about COTS elements deployed in a given PoP and how they are interconnected are hidden to the Network Operator in this process.
The HW pool description is provided by a COTS HW integrator, who specifies the microscopic view of the HW components deployed in the PoPs. This agent ignores the SW-based functions which might be deployed in the HW pool in the future.

With these three inputs, the system produces a SW to HW mapping (5) that is used to deploy the SW-based Network Functions on the HW pool.

The Network Operator is relieved from performing the SW-to-HW mappings. The network level requirements supplied by the Network Operator and the specifications provided by the SW Appliance Vendor are combined by the system to deploy SW Appliances in the best possible location in the HW pool. These specifications include performance guarantees for a specific SW Appliance on given HW and Virtualisation environment. The mapping process also handles conflicts and other situations, where a deployment is not possible.

The SW to HW mapping produced enables the HW pool to provide a given networking service to a collection of service points. The networking service may optionally include provision of a percentage of data hand-off to external networks at selected data hand-off points. Traffic flowing in the direction from a service point towards the hand-off point is called in the context of this invention upstream traffic, whereas traffic flowing in the direction from the hand-off points to the service points is called downstream traffic.

Figure 2:
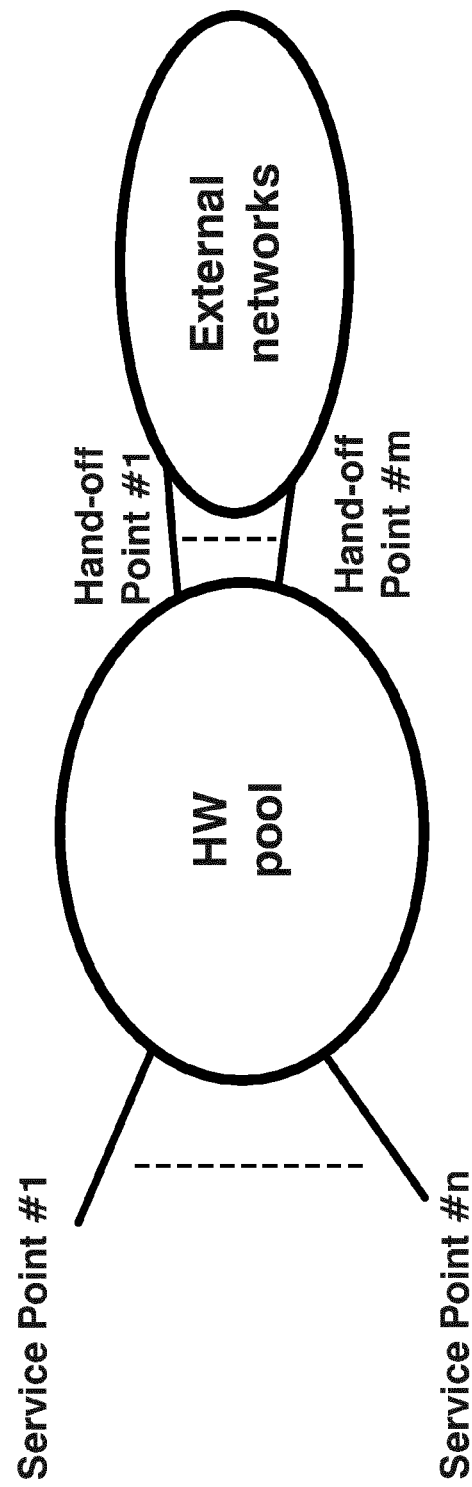
FIG. 2 shows an implementation of a networking service offered by a network constituted by a HW pool on which SW-based network functions have been mapped, and which is connected to some external networks, according to the method of the first aspect of the invention, for an embodiment.

An implementation of such a networking service is depicted in FIG. 2, where such a service is offered to several Service Points (#1 . . . #n) by a network constituted by a HW pool on which SW-based network functions have been mapped, and at selected data hand-off points (#1 . . . #m) to external networks.

With the SW-to-HW mapping output by the system of the invention, the network operator deploys a new networking service effectively turning the HW pool into a network. The resultant network is built around the geographic locations of the HW pool where a number of servers based on Commercial Off-The-Shelf (COTS) equipment components are deployed. These servers are interconnected within the location via a local interconnection data plane and to other sites via Wide Area Network (WAN) interfaces.

The resultant networking service is implemented by means of a collection of Network Functions, implemented by a set of software (SW) appliances, interconnected as instructed by the Networking service Design supplied by the network operator.

SW Appliance Declaration:

SW Appliances are defined by the implemented functionality, and their expected performance for a given HW requirements. These features are expressed in a SW appliance declaration in the form of a template including:

1. The network function implemented. If more than one function is implemented by the SW appliance, the internal chaining of NFs (Network Functions) is included, expressed in upstream network order, e.g. NF1: BRAS NF, NF2: CGNAT NF, Chain NF implemented: BRAS→CGNAT.
2. One recommended HW configuration, specifying:
   i. Expected performance, expressed as the maximum number of service points served, maximum traffic supported, and any other performance figure relevant for the NF implemented by this SW appliance, which can be handled by one instance of the appliance in this HW configuration.
   ii. A list of HW requirements for deployment ("microscopic requirements"), using a template in terms of:
      a. Number and type of threads implementing the SW appliance.
      b. Groupings of threads (for throughput purposes, the SW appliance may need to execute some threads in processor cores which share resources, like cache memory, etc.).
      c. Amount of memory that each thread or group needs and throughput with this memory.
      d. Throughput requirements for inter-thread/group communication.
      e. Number of Interfaces handled by each thread or group (type, line speed, etc.).
      f. Throughput requirements for the access to interface cards by each thread/group.
      g. Whether the SW Appliance needs exclusive access to the resources it is assigned by the mapping system (for example exclusive use of a core, exclusive use of an interface card) or if the resources can be shared among several SW Appliances. If the SW appliance needs exclusive use to the mapped resources (typically, those related to the data plane of the network), it will have to be mapped to servers in the HW pool that provide an appropriate view of their resources (e.g. the hypervisor does not hide the cores, processors, etc., used by a given piece of software running on top of it).
      h. Hard disk storage requirements in terms of size and speed.

Each SW appliance declaration is provided by the SW developer/vendor that produces the SW appliance. The same vendor can provide several SW appliances declarations if the same piece of SW implementing a Network Function achieve different performance figures with different HW configurations.

Figure 3:
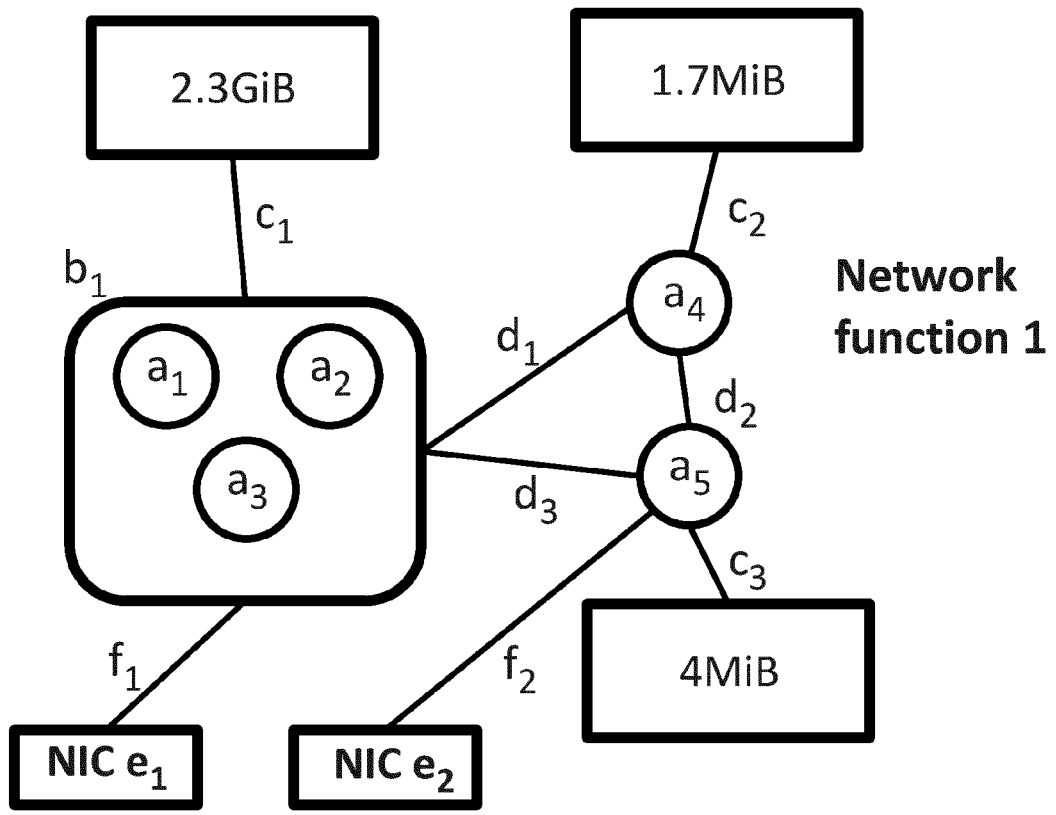
FIG. 3 shows a graphical representation of the microscopic description of two SW appliances.
Figure 3:
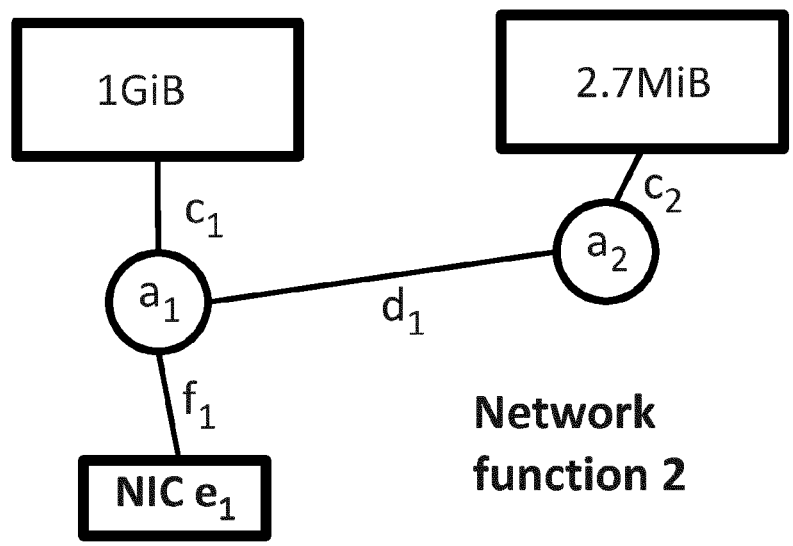

FIG. 3 shows a graphical representation of the microscopic description of two SW appliances making use of letters a to f to represent variables for the HW requirements of each SW appliance. Each letter corresponds to a value corresponding to a HW requirement category in the template as defined above using the same letters for each category. Therefore, value $a_i$ makes reference to a thread in the SW appliance, $b_i$ makes to a grouping of threads (grouping of $a_i$ values) as defined by the graphical representation and so on for the rest of categories in the template that are shown in the graphical example (a to f).

The whole set of SW appliance declarations to be taken into account by the system are fed to the SW-to-HW mapping system in the collection of SW appliances declarations (2).

The collection of SW appliances declarations can be stored in a repository for its use by the SW-to-HW mapping system, for instance, as XML files specified by an XSL template reflecting a list of instances of the SW appliance template.

Networking Service Design Definition:

A network operator that wants to deploy a networking service making use of the HW pool and a collection of SW appliances must provide a Networking service Design Definition to the mapping system so that this can conduct the SW-to-HW mapping.

The Networking service Design definition is expressed in terms of a template that includes:

1. An average traffic characterization of the service points.
   The traffic characterization provides average values per service point at least for:
      Input and output data bandwidth per service point.
      Average rate of control requests from the service point to the HW pool.
2. The networking service data chain.
   The data chain explicit the list of Network Functions that must be applied to the data traffic ingressing the network from the service points in the upstream direction.
   An example data chain for an Internet access networking service could be Service Point→BRAS→CGNAT→hand-off. The reverse data chain implicitly applies to the traffic on the reverse direction.
   The first NF in the data chain after the Service Point is known as the Edge NF for the networking service. In the previous example, the BRAS NF is the Edge NF.
   For each Network Function in the data chain 2 values are provided by the network operator based on its behaviour expectations for the networking service:
      The traffic gain as a ratio of data traffic entering the Network Function and data traffic being output by the Network Function.
         As an example, a unicast router has a 1:1 ratio, whereas a multicast router or a Content Delivery Network node can be modelled with a 1:N ratio.
      The hand-off ratio.
         This is the percentage of data traffic in the upstream direction received at the Network Function from the service points that is forwarded towards the hand-off points. In case of a typical Internet access networking service, the overall network hand-off ratio could be as high as 95%. If a specific Network Function behaves in a split horizon fashion (no upstream traffic is sent back in the direction of the service points) this ratio is 100%. If data traffic from a service point is destined to another service point in the network, the traffic will turn direction on the first NF that allows for turning upstream traffic into downstream traffic (that means that the NF has a hand-off ratio less than 100%).

3. The networking service control chains

A control chain details a set of NFs that interchange control traffic required for a specific particular purpose of the networking service.

For one networking service, several control chains are possible with different sets of NFs involved. For instance for a Broadband DHCP based Internet access service, there may exist 2 control chains:

Control Chain #1: BRAS NF-DHCP server NF.

This control chain enables the handling by the HW pool of the DHCP requests received at the service points attached to the BRAS, as part of the networking service being provided with this Networking service Design Definition.

Control Chain #2: BRAS NF-RADIUS server NF

This control chain enables the generation of RADIUS requests based on traffic activity after a timeout received at the service points attached to the BRAS, as part of the networking service being provided with this Networking service Design Definition.

4. The Network Function areas definition (optional).

A Network Function area is a per-NF collection of locations of the HW pool so that it is enforced that the traffic from service points attached to any location of the NF area addressed to service points that belong to other areas of the same NF will be applied the corresponding Network Function in a SW appliance deployed in the NF area before leaving the NF area.

As an example, a Networking service Design Definition may define CGNAT areas. Each CGNAT area is a collection of possible locations for the CGNAT function to be applied to traffic from customers connected to any of the locations in the CGNAT area.

The number of service points covered in a NF area determines the dimensioning of the NF aggregate capacity that has to be deployed in the NF area by means of SW appliances that implement the NF. The assignment of the SW appliances to HW resources in the NF area will be conducted as part of the method of the mapping system.

If no NF areas are defined, the aggregate capacity for the NF is the one that serves all the service points attached to the HW pool and the whole HW pool is considered as a candidate for location of the SW appliances implementing the aggregate NF capacity.

By an appropriate NF area definition, the network operator can exclude specific locations as candidates for deploying the NE, just by leaving these locations out of the NF area.

5. A set of preconditions on the HW pool regarding NF placement.

If due to any internal planning policy, the network operator desires to further influence the placement of specific NFs on specific locations it can make use of a precondition that marks the location as "not available for NF #X".

The Networking service Design Definition for each NF with preconditions will include a list of the locations, or classes of locations, affected by the precondition.

As an example, the Networking service Design Definition may include 2 preconditions:

Not available for CGNAT: all locations in the Access Center class of locations.

Not available for DPI (Deep Packet Inspection): all locations in the Control Pool class of locations.

The HW pool description (3) provides definition of the classes that each location in the HW pool belongs to. Making use of the preconditions, the network operator can for instance limit a NF #X to be deployed at a specific location by marking all but one location as "not available for NF #X".

The Networking service Design Definition can be stored, for instance, as an XML file specified by an XSL template reflecting the Networking service Design Definition template, for its use by the SW-to-HW mapping system.

Figure 4:
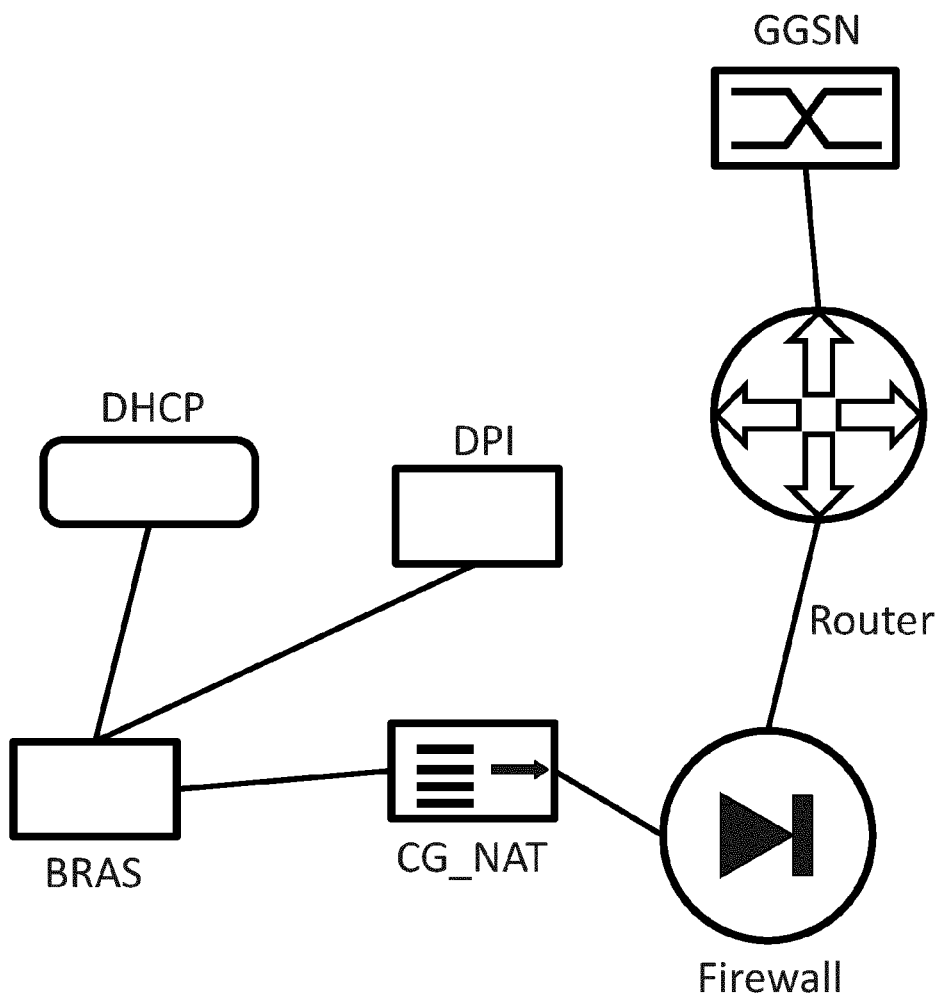
FIG. 4 shows a Networking service design graphical example obtained by means of the mapping of the method of the first aspect of the invention.

FIG. 4 shows a simplified graphical example of a networking service design, involving a BRAS, a DHCP, a DPI, a CGNAT, a Firewall, a Router and a CGSN (Combined General Packet Radio Service Support Node).

HW Pool Description:

The HW pool description provides a detailed list of the locations of the HW pool, providing both the macroscopic and the microscopic view of each location.

For each location in the HW pool, the following information is provided in terms of a location template:

1. Location name.

A unique name of the location in the HW pool.

2. Location classes this location belongs to.

For instance, the location belongs to the location class "Access Center" or any other defined class for this HW pool.

3. Data plane connection available at the location.

The internal connectivity available between the nodes, the service points and the hand-off points in a location is modelled as an any-to-any data plane of a given amount of "backplane" bandwidth (e.g. 100 Gb/s).

4. Number of service points.

The number of service points that are commissioned physically to the data plane connection of this location.

Any location hosting service points is known as an Edge Location.

5. Number of hand-off points.

Number of hand-off points that are commissioned physically to the data plane connection of this location.

Any location hosting hand-off points is known as a Hand-off Location.

6. List of WAN interfaces that connect this location to the rest of the HW pool.

For each interface it will be listed:

Type and speed of the WAN interface (e.g. 100 Gb/s Ethernet).

Connectivity model. Either point-to-point (e.g. dark fiber WAN connection) or point-to-multipoint (e.g. IP or MPLS interface).

For point-to-point interfaces, peer location. The location name of the end-point of the point-to-point WAN interface.

7. Detailed list of servers at the location (microscopic view of the location).

For each node at the location, its physical resources are listed, using a template expressed of in terms of:

A. Number and type of physical processors provided on the board. Performance in terms of processing speed is also included.

B. Grouping of processor cores into sockets and amount of cache memory provided by each processor.

C. Amount of memory provided by each of the memory banks. Interconnection throughput between processor cores and memory banks.

D. Throughput provided by inter-sockets communication buses.

E. Number of Interface cards (type, line speed, etc.).

F. Interconnection between processor cores and interface cards. If this interface is attached to a specific grouping of processor cores directly, or not using a South Bridge.

G. Kind of pool (data or control plane pool). SW appliances that have tight performance requirements (typically, those related to the data plane of the network), in order to avoid performance degradation and to allow for an exclusive use of the resources mapped to them, require a tight coupling with the hardware details exposed to the virtualization environment on top of which they are deployed. The area of the pool of HW resources that provide this level of HW view detail, and where network functions of this kind can be deployed, will be called "pool for the data plane". Network functions that do not have tight performance requirements (typically, those related to the control plane of the network) might be mapped to a less stringent HW pool, called "pool for the control plane", when available, although it is possible to map them to the "pool for the data plane" when there are no vacant resources in the "pool for the control plane" or even if this pool does not exist at all.

The terms "Control Plane" refer to the Network Functions that implement control procedures so that forwarding of packets can be carried out, and the terms "Data Plane" to the Network Functions that take part in the forwarding of the data packets to be carried in the network.

Figure 5A:
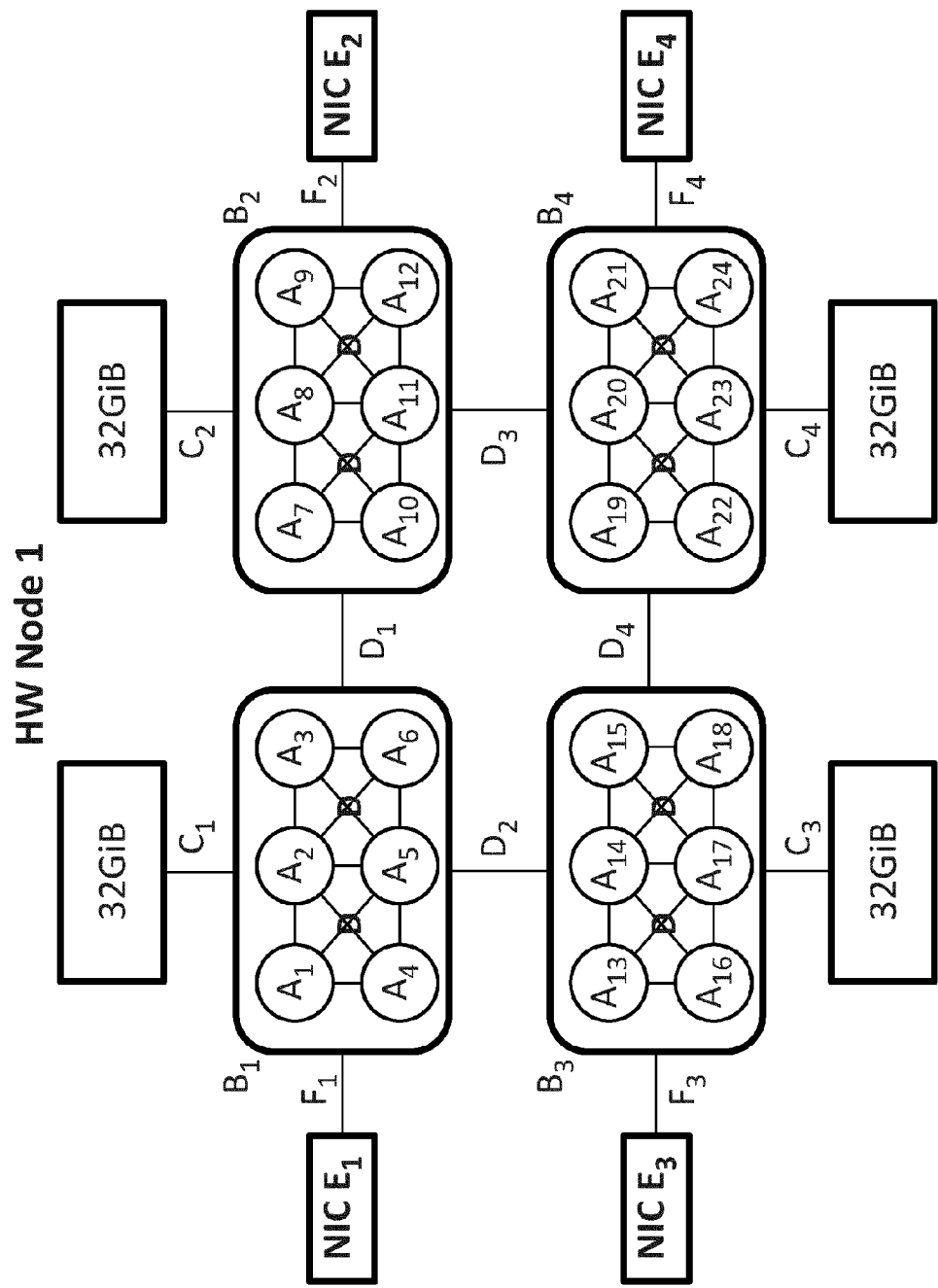
FIG. 5a shows a graphical representation of the microscopic view of a node.

FIG. 5a shows a graphical representation of the microscopic view description of a node making use of letters A to F to represent variables for its physical resources. Each letter corresponds to a value corresponding to a physical resource category in the node template as defined above using the same letters for each category. Therefore, value $A_i$ makes reference to a processor on the board, $B_i$ makes to a grouping of processors (grouping of $A_i$ values) as defined by the graphical representation and so on for the rest of categories in the template that are shown in the graphical example (A to F).

The HW pool description can be stored, for instance, as an XML file specified by an XSL template reflecting a list of instances of the location template, for its use by the SW-to-HW mapping system.

Figure 5B:
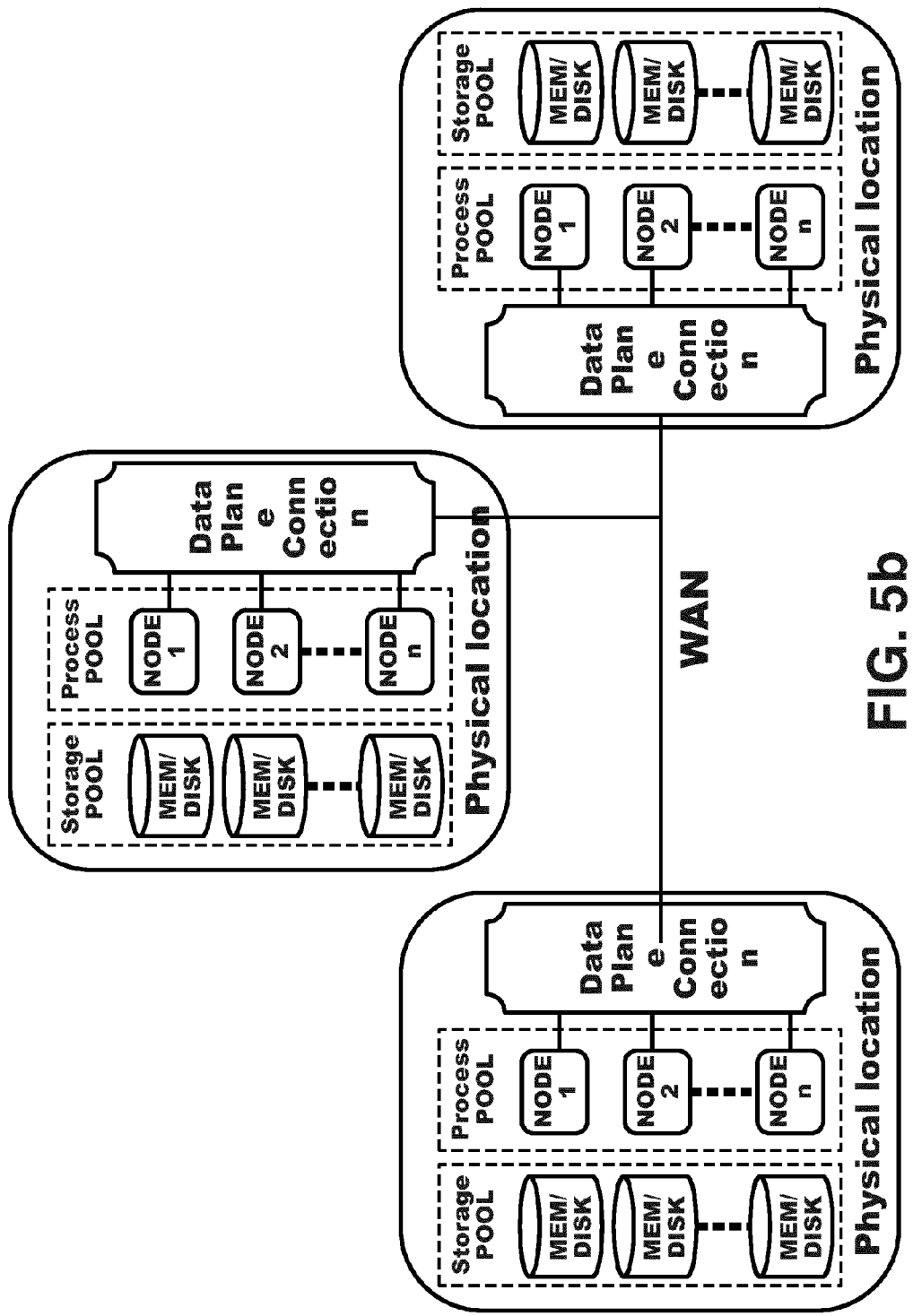
FIG. 5b shows a simplified graphical example of a HW resource pool description.

FIG. 5b shows a simplified graphical example of a HW pool description, where three physical locations are interconnected by a WAN through respective Data Plane Connection Interfaces, each physical location comprising a process pool including n computational nodes, and a storage pool including a plurality of storage devices (memories and/or hard drive disks).

SW to HW Mapping Method:

The SW-to-HW mapping method uses both the macroscopic and microscopic views that are defined by the three inputs to the system:

The macroscopic view as defined by:
 The macro performance figures of the SW appliances.
 The macro design of the networking service to be provided as specified in the Networking service Design Description.
 The macro view of the locations as specified in the HW pool description.

The microscopic view as defined by:
 The micro requirements of the SW appliances.
 The micro view of the locations as specified in the HW pool description.

Figure 6:
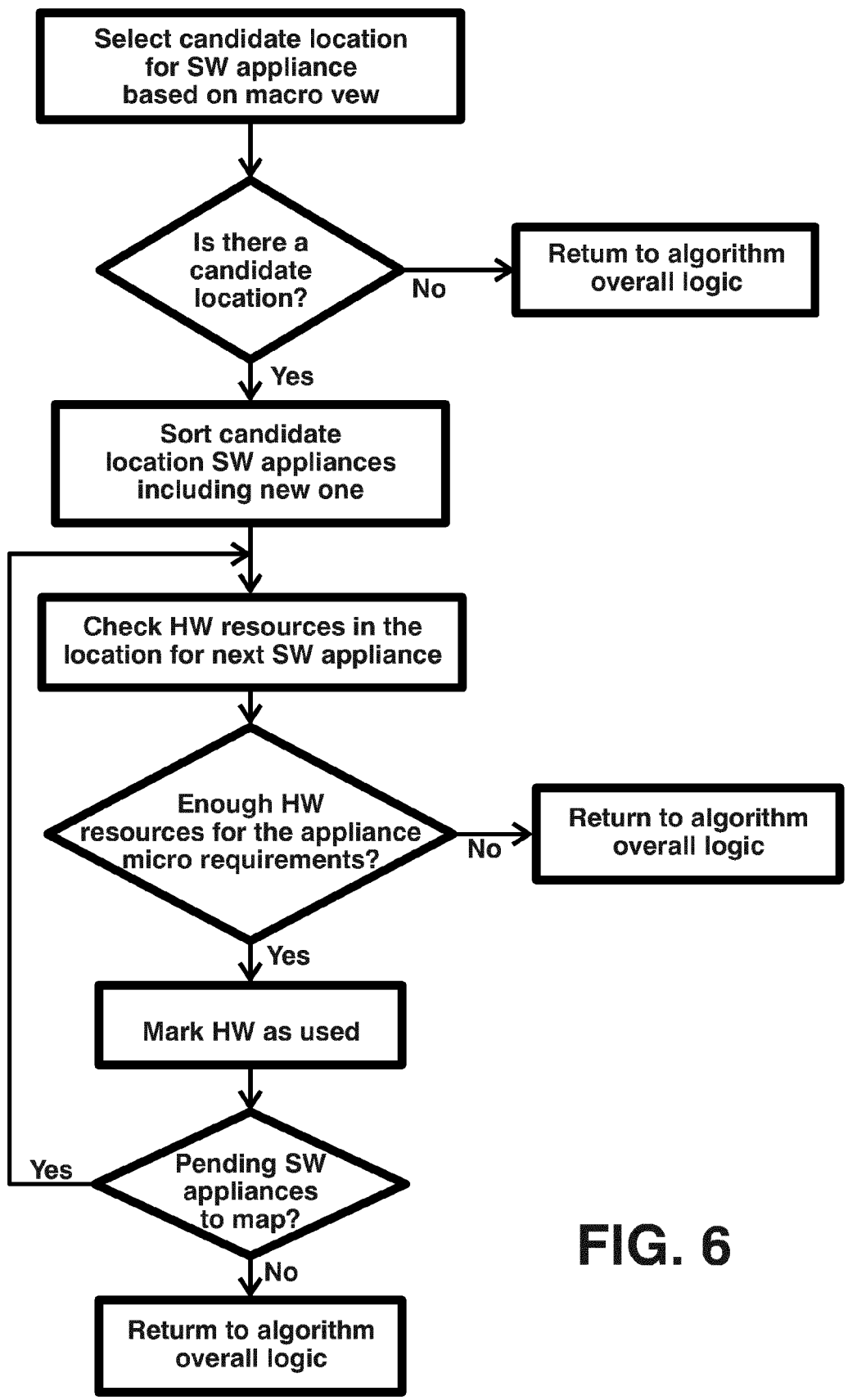
FIG. 6 is a flow chart of a mapping sequence for a given SW appliance, for an embodiment of the method of the first aspect of the invention.

With a given set of inputs to the system, many degrees of freedom are possible to achieve the mapping of SW to HW resources of the pool. Therefore, the SW-to-HW mapping method runs to find a solution in an iterative way characterised by the fact that at discrete points in the algorithm logic, and to eventually proceed, it is enforced to perform the following "mapping sequence" of events as shown in the flow chart of the embodiment of FIG. 6:

select a candidate location for some SW appliance implementing a given network function to be deployed based on the macroscopic view, and, if there is a candidate location, then,
 if previously the method has assigned other SW appliances to this location, perform the sorting of the whole set of SW appliances for this location, including the new one to be mapped, starting with those with more restrictive micro requirements in the sense that they require a bigger number of groups of cores residing on the same physical socket and with exclusive access to I/O cards, and then,
 check in order the availability of HW resources on the selected location, by contrasting the micro requirements of the SW appliances with the micro description of the location, and then,
 if there are enough HW resources, and, if the SW appliance requires exclusive use of the resources, mark these resources as exclusively used so that they are no longer available for subsequent mappings, or, if the SW appliances allows a shared use of the resources, mark these resources as used in shared mode (this step is not shown in the flow chart), and then
 if there are still pending SW appliance to be mapped go to the above indicated step of HW resources checking and perform the steps following said checking;
 when there are no more pending SW appliances, return to algorithm overall logic, this return is also performed if the selection of a candidate location cannot be done because there is no available candidate location, and also if there are not enough HW resources.

Only the servers at the selected location that are suitable for each SW appliance will be considered as candidate servers. The eligibility of a server as a candidate target for a SW appliance will depend on the view detail required by the SW appliance declaration.

The algorithm logic will start applying the preconditions and the partitioning available at the networking service design to account for a reduction of complexity of the remaining problem after their application. For the mapping of network functions to HW resources with several possible options, the algorithm logic will be such that it optimises some criteria (e.g. the WAN bandwidth, the used HW resources, the number of locations used) for a given networking service. The network operator is free to envision and use the logic that best suits its needs. As part of its iterations, the algorithm will perform "mapping sequences" as described previously either for performing final mappings or for performing temporary tentative mappings as part of its iterative behaviour. The algorithm will iterate till an assignment that meets all the requirements is found. If a valid mapping is not found after a predefined set of iterations, the method concludes with an error condition, indicating that there are no enough available resources in the HW pool.

Next, an embodiment of the method of the first aspect of the invention is describes, said embodiment defining an example method to map SW-based network functions to HW resources of a pool is an iterative process that is described in the following stages:

1. Edge NF mapping.
 In this stage all the Edge Locations are checked to have the HW resources for hosting the Edge NF aggregate capacity required at each Edge Location. The Edge NF aggregate capacity at each Edge Location required is dependent on the number of service points commissioned to the specific Edge Location. For checking the availability of HW resources, the system tries the SW appliances from the collection of SW appliances declarations that implement the Edge NF that provide a performance that is over the Edge NF aggregate capacity required at the Edge Location, starting with the SW appliance with the smallest performance figure.

Once a match is found between a SW appliance implementing the Edge NF and the available HW resources is found, the systems records the mapping and marks the HW resources as used. If a match is not found for some Edge Location, the method is finished with an error condition.

2. Data Chain NF mapping.

In this stage, for each NF in the data chain, in order and starting with the NF that is next to the Edge NF in the data chain, and for each area defined for that NF, the following steps are conducted:

i. The aggregate capacity for the NF in the NF area is calculated from the number of service points that are commissioned in locations of the NF area and its traffic characteristics for the networking service.

ii. If the NF has a traffic gain over a 1:1 ratio or if the NF has a small hand-off ratio (the small threshold being a configurable value), the SW appliance with the smallest performance figure for that NF (minimal SW appliance for the NF) is selected and the system tries to map resources using that minimal SW appliance starting with the locations that are closer to the location hosting the previous NF in the data chain for that NF area. As many minimal SW appliances are mapped as required till the aggregate capacity for the NF in the NF area is reached. If the resources for mapping the minimal SW appliances are not available considering all possible locations in the NF area, the method is finished with an error condition.

If, as a result of this step, several minimal SW appliances end up being mapped to the same location and the sum of their performance figures is over the performance of another SW appliance implementing the NF, the system decomposes the performance sum making use of a mix of instances of this new SW appliance and the minimal SW appliance for this NF.

Else iii. If the NF has a hand-off ratio over the threshold, the SW appliance with the smaller performance figure that is over NF area aggregate capacity is selected. The system tries to map resources using that SW appliance starting with the location that is farther from the location hosting the previous NF in the data chain for that NF area. If not enough HW resources are available at this location, the system iterates this check with locations closer to the previous NF. If a location with available resource is found, it is selected and mapped. If no location is found, the system divides the NF area in smaller NF areas and reapplies the steps of this stage for this NF. If no subdivision is possible and no mapping is possible, the method is finished with an error condition.

3. Control Chains NF mapping.

In this stage, for each Control Chain, and for each NF in the control chain, in order and starting with the NF that is next to the Edge NF in the control chain, and for each area defined for that NF, the following steps are conducted:

i. The aggregate capacity for the NF in the NF area is calculated from the number of service points that are commissioned in locations of the NF area and its traffic characteristics for the networking service regarding the average service point control requests rate.

ii. The SW appliance with the smaller performance figure that is over NF area aggregate capacity is selected. The system tries to map resources using that SW appliance starting with the location that is farther from the location hosting the previous NF in the control chain for that NF area. If not enough HW resources are available at this location, the system iterates this check with locations closer to the previous NF. If a location with available resource is found, it is selected and mapped. If no location is found, the system divides the NF area in smaller NF areas and reapplies the steps of this stage for this NF. If no subdivision is possible and no mapping is possible, the method is finished with an error condition.

A person skilled in the art could make changes and modifications to the here described embodiments without departing from the scope of the invention as defined in the appended claims.

The invention claimed is:

1. A computer-implemented method for providing a networking service, comprising mapping software-based network functions to hardware resources, wherein said hardware resources are included in a hardware resource pool, wherein said mapping is dynamically performed on unallocated resources of said hardware resource pool and based on at least the next information:

specific hardware constraints for the supporting of each of said software-based network functions, wherein:

said software-based network functions are implemented by software appliances, each of them implementing at least one software-based network function;

said specific hardware constraints information is provided by means of software appliance declarations including information regarding the network function or functions implemented and at least one specific hardware configuration recommended for the implementation thereof; and said hardware constraints refer at least to hardware requirements and to the expected performance for at least said specific hardware configuration to support each software-based network function of each software appliance, wherein said hardware requirements include some or all of the next information:

number and type of threads implementing the software appliance;

groupings of threads;

amount of memory that each thread or group needs and throughput with this memory;

throughput requirements for inter-thread/group communication;

number and features of Interfaces handled by each thread or group;

throughput requirements for the access to interface cards by each thread/group;

whether the software appliance needs exclusive access to the hardware resources it is assigned by said mapping or if the hardware resources can be shared among several software appliances; and
hard disk storage requirements in terms of size and speed;
network requirements of at least one defined networking service design for a service making use of said hardware resource pool and of at least part of said software-based network functions; and
a hardware description of the hardware resources included in the hardware resource pool, wherein the hardware resource pool comprises a plurality of locations, providing information regarding the locations of the hardware resource pool at both a macroscopic and a microscopic view of each location, including:
at a macroscopic level for each location: location name, list of computational nodes and data plane throughput between said computational nodes; and
at a microscopic level a detailed description of every computational node regarding:
number and type of physical processors provided on a circuit board of the computational node;
performance in terms of processing speed of the physical processors;
grouping of processor cores into sockets and amount of cache memory provided by each processor;
amount of memory provided by each of several memory banks, and interconnection throughput between processor cores and memory banks;
throughput provided by inter-sockets communication buses;
number and features of Interface cards;
interconnection between processor cores and interface cards, including information regarding if each interface is attached to a specific grouping of processor cores directly or not; and
kind of hardware resources pool: data or control plane pool,
wherein said mapping is performed in the form of a sequence of events by iteratively running an algorithm including logic at discrete points; and
wherein said amount of memory that each thread or group needs and throughput with this memory, said throughput requirements for inter-thread/group communication, said number and features of Interfaces handled by each thread or group and said throughput requirements for the access to interface cards by each thread/group, included as part of said hardware requirements, being mapped to corresponding HW capacities of the computational nodes.

2. The method of claim 1, wherein said specific hardware constraints information is provided ignoring information about said hardware resource pool and said hardware description information is provided ignoring information about said software-based network functions.

3. The method of claim 1, wherein said expected performance relates to at least one of maximum amount of users supported, maximum number of devices supported, maximum number of service points served and maximum throughput supported.

4. The method of claim 1, wherein said network requirements relate to at least software-based network functions to be deployed in Points of Presence and an amount of clients which need to be served.

5. The method of claim 4, wherein said network requirements are provided ignoring information about hardware elements deployed in a given Point of Presence.

6. The method of claim 4, wherein said network requirements are provided by means of a networking service design definition with topological requirements, throughput requirements for each software-based network function and connectivity requirements between said software-based network functions.

7. The method of claim 6, wherein said networking service design definition includes information relating at least one of:
average traffic characterization of the service points;
networking service data chain, detailing of the software-based network functions that must be applied to the data traffic ingressing the network from the service points in the upstream direction;
networking service control chains, each detailing a set of software-based network functions that interchange control traffic required for a specific particular purpose of the networking service;
network function areas definition, where each network function area is a per-network function collection of locations of the hardware resource pool; and
a set of preconditions on the hardware resource pool regarding software-based network functions placement.

8. The method of claim 1, wherein said hardware resource pool comprises:
a plurality of computational nodes deployed across several physical locations, where each location is specified by the components of its computational node at a computer architecture or microscopic level or view, and
a layout by which these computational nodes are interconnected among them both inside the location and/or to other locations with corresponding connections, at a network or macroscopic level or view.

9. The method of claim 1, wherein said sequence of events is performed according to following steps:
select a candidate location for the mapping of at least a new software appliance implementing a given software-based network function to be deployed based on the macroscopic view, and then,
if previously the method has assigned other software appliances to said selected candidate location, perform the sorting of a whole set of software appliances for this location, including said new one to be mapped, starting with those with more restrictive requirements, in a microscopic view, and then,
check in order the availability of hardware resources on the selected candidate location, by contrasting, according to said microscopic view, the requirements of the appliances with the description of one or several microscopic computational nodes, so that the required memory and throughput, processors, network interfaces are met by said hardware; and then,
if there are enough hardware resources and if the software appliance requires exclusive use of the hardware resources, mark these hardware resources as exclusively used so that they are no longer available for subsequent mappings, or, if the software appliances allows a shared use of the hardware resources, mark these hardware resources as used in shared mode.

10. The method of claim 1, comprising deploying said networking service by at least constituting a network with the hardware resources to which the software-based network functions are mapped, and the interconnection thereof.

11. A system for providing a networking service, comprising a hardware resource pool and a computing device having access to said hardware resource pool and to software-based network functions, where said computing device implements a method for providing a networking service comprising mapping software-based network functions to hardware resources of said hardware resource pool, wherein said computing device implements the method of claim 1.

12. A non-transitory computer readable medium comprising instructions that when executed by a processor cause the processor to perform the method of claim 1.

* * * * *